April 23, 1957 J. E. WOODS 2,789,785

BUTTERFLY VALVE

Filed Feb. 4, 1953

INVENTOR.
John E. Woods
BY Kenway, Jenney, Witter
& Hildreth
ATTORNEYS

United States Patent Office 2,789,785
Patented Apr. 23, 1957

2,789,785
BUTTERFLY VALVE

John E. Woods, Cohasset, Mass., assignor to Standard-Thomson Corporation, Boston, Mass., a corporation of Delaware Application February 4, 1953, Serial No. 335,100

2 Claims. (Cl. 251—174)

The present invention relates to butterfly valves, and more particularly to an improvement whereby the valve may be closed tightly without sticking.

The usual construction of butterfly valve is extremely simple, being characterized by a body having formed therein a fluid channel, and a throttle disk rotatable about a transverse shaft, the disk having a diameter equal to or greater than the inside diameter of the channel, whereby the disk may be positioned in a manner to pass the fluid, or to throttle it.

In its nature, this type of construction often presents considerable difficulties. For example, closure of the valve is effected by the fit of the disk edges with the surface of the fluid channel. The necessarily small area of contact greatly increases the possibility of leakage, unless the fit is very precise and the valve is closed tightly. Both the throttle disk and the walls of the channel are constructed of inflexible material. Thus, tight closure, particularly if frequent, causes wear on the channel walls and on the disk edges, thereby eventually producing a change in the fit. Moreover, if the valve is closed tightly, it may be extremely difficult or virtually impossible to open again, as in the case where the valve is cool when closed, but hot through contact with fluids or for any other reason when it is desired to open the valve. Another difficulty is that of locating the position of the shaft axis relative to the fluid channel. Ordinarily, great care and concomitant expense are involved in achieving the requisite precision.

It is the purpose of this invention to provide an improvement in butterfly valve construction including provision to effect a complete closure without binding, and to compensate, within limits, for deviations in the shaft position relative to the fluid channel. Thus, the object is to secure the desirable characteristic properties of the butterfly valve, while eliminating certain disadvantages heretofore thought to be inherent in the nature of this type of valve construction.

A principal feature of the invention is the use of a thin inner sleeve flexibly mounted with a clearance inside the fluid channel, whereby the throttle disk is closed against the sleeve rather than against the wall of the channel.

Another feature is the use of a flexible, annular, folded support for one end of the sleeve, resembling one fold of a bellows, having an external end of the fold secured to the body of the valve, and the internal end to the sleeve.

According to another feature, the throttle disk is an oval with one diameter exceeding that of the sleeve, whereby when the valve closes, the disk deforms the sleeve from a circle, causing it to grip tightly at the sides of the disk without permitting the disk to stick in the closed position.

Other features of the invention relate to certain features of construction and structural arrangements, especially suited to fulfill the above objects and to simplify the construction and improve the characteristics of the valve.

The features of the invention are fully described hereinafter with reference to a preferred embodiment as shown in the drawings, in which.

Figure 1:
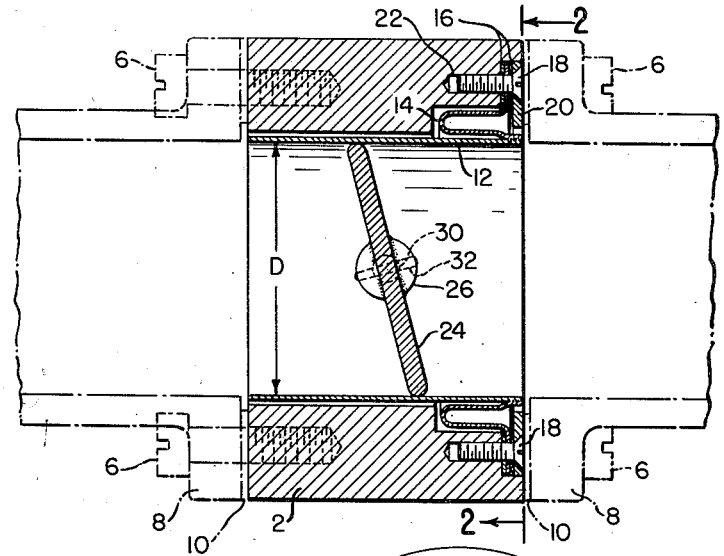
Fig. 1 is a section through the valve in a plane parallel to the channel axis.

Referring to Fig. 1, the body 2 of the valve has a number of mounting holes 4 (see Fig. 2) drilled and threaded therein to receive mounting screws 6. By means of these screws, flanged pipes 8 forming a part of the fluid line are secured with gaskets 10 to the body 2.

The body 2 has a cylindrical bore passing completely through it, and two annular recesses of larger diameter near one end. A flexible thin metal sleeve 12 is supported coaxially within the bore. The support 14 for the sleeve consists of an annular member of channel shape, preferably in the nature of a single fold of a bellows, welded or otherwise secured to one end of the sleeve 12, continuously around its circumference. The outer end of the fold is formed into a flange secured between gaskets 16 by a number of screws 18 (see also Fig. 2) and an annular mounting ring 20, the screws being threaded into holes 22 in the main body.

As shown in Fig. 1, the recesses in the body 2 accommodate the annular support 14 and the mounting ring and screws, thereby providing a flush surface for the gasket 10, and permitting the support 14 to hold the sleeve 12 in the position shown, wherein a slight clearance is provided between the sleeve and the body of the valve. It will be observed that one end of the sleeve 12 is unsupported, thereby permitting fluid to fill this clearance space and to surround the annular support 14. However, the gaskets prevent this fluid from leaking out of the valve. Similarly, the inside clearance of the mounting ring 20 is such as to allow fluid to enter the interior of the fold in the support 14, but the gaskets provide a seal on this side of the support as well.

Figure 2:
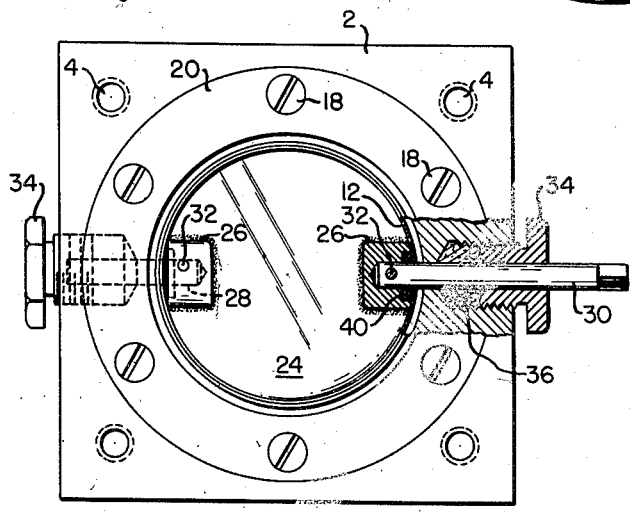
Fig. 2 is an end elevation of the valve as indicated in Fig. 1.

The structure of the throttle disk assembly is shown in Fig. 2. The disk 24, having rounded edges and sufficient thickness to insure inflexibility in operation, has a pair of short, cylindrical hub blocks welded or otherwise secured to its periphery 26. The blocks 26 are drilled to support a pair of shafts 28 and 30, having a common axis passing through a diameter of the disk 24, the shafts being secured to the blocks by dowel pins 32. The shafts are supported in the body 2. The shaft 30 is elongated to provide a protruding end adapted for a lever, valve handle, or the like. Each shaft is supported for rotation in an externally threaded nut 34 adapted to be screwed into a stuffing box into which a fluid-tight stuffing of any appropriate material 36 has been loaded.

The blocks 26 have annular recesses 38 adapted to receive seals 40 to prevent leakage from the inside of the sleeve 12 through the holes drilled therein to receive the shafts 28 and 30. For low temperature applications O-rings may be used for the seals 40, but for high temperature applications, as for jet engines, for example, high temperature seals will be used. Leakage from the outside of the sleeve 12 through the holes drilled in the body 2 to receive the shafts is prevented by the stuffing boxes.

Figure 3:
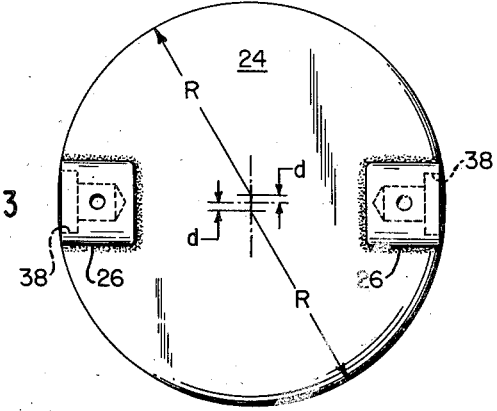
Fig. 3 is a view of the throttle disk illustrating the dimensions thereof.

The throttle disk 24 is of a general oval shape, as shown in Fig. 3. The preferred outline comprises two semi-circular arcs of radius $R$, each having its center offset by a distance $d$ in a direction at right angles to the axis of the shafts 28 and 30. Thus the disk has a major diameter of $2R+2d$. The inside clearance $D$ of the sleeve 12 equals $2R$. Therefore, the disk has a greater diameter than the inside diameter of the sleeve 12, and complete closure is effected when the disk is at an acute angle with respect to the axis of the fluid channel. It will be obvious that other methods of generating the shape of the disk periphery may be employed. For example, such methods might depend upon the shape of the sleeve 12, which might be other than cylindrical, if desired.

By reason of the shape of the disk 24 and the flexible properties of the sleeve 12, the sleeve is slightly bulged by the disk when the valve is closed. The top and bottom portions of the edge of the disk deform or distort the sleeve slightly from its circular form, and thereby make it conform to the edge of the disk at the sides thereof, thereby preventing leakage not only at the top and bottom, but also at the sides.

The valve may be easily opened again, since the sleeve 12 exerts only a limited restraint upon the edges of the disk. Expansion or contraction of the disk or the sleeve cannot cause the valve to bind in the closed position, since the arrangement is entirely flexible.

The coaction of the support 14 with the disk 24 and the sleeve 12 insures a tight fit when the valve is closed, even though the shafts 28 and 30 are incorrectly centered or are not held rigidly in place. By reason of the bellows fold, the internal part of the support 14 is capable of movement, and the clearance between the sleeve and the main body of the valve permits shifting of the sleeve axis within certain limits. Thus, as the valve is closed, the sleeve tends to position itself, as the edges of the disk 24 come into contact with it, to produce an optimum fit between the disk and the sleeve. The possibility of obtaining a close fit is of utmost importance in controlling the flow of hot fluids, as for example, in connection with jet engines and gas turbines.

It will be understood that the invention has been described with reference to a preferred embodiment, and that certain minor modifications of structure, shape, and design may be effected to suit the particular purposes for which the valve is intended. These changes and modifications, being within the skills of one familiar with this art, do not constitute a departure from the spirit or the scope of the invention.

Having thus described my invention, I claim:

1. A butterfly valve comprising the combination of a body having a tubular fluid channel, a unitary, generally cylindrical flexible sleeve within the channel, a folded, annular, radially flexible support securing and sealing one end of the sleeve to the wall of the channel with a clearance between the outer sleeve wall and the channel, the other end of the sleeve being free, a rotatable shaft passing transversely of the channel and through the sleeve at a position longitudinally displaced from said support toward said free end, and a disk mounted on the shaft within the sleeve, said disk having a dimension greater than the diameter of the sleeve, whereby rotation of the shaft causes radial distortion of the sleeve to form a seal.

2. A butterfly valve comprising the combination of a body having a tubular fluid channel, a unitary, generally cylindrical, flexible sleeve within the channel, a radially flexible support for the sleeve having an annular bellows fold secured externally to the body and internally to one end of the sleeve, said support sealing said end to the wall of the channel and supporting the sleeve with a clearance between its outer wall and the channel, the other end of the sleeve being free, a rotatable shaft passing transversely of the channel and through the sleeve at a position longitudinally displaced from said support toward said free end, and a disk mounted on the shaft within the sleeve, said disk having a dimension greater than the diameter of the sleeve, whereby rotation of the shaft causes radial distortion of the sleeve to form a seal.

References Cited in the file of this patent

UNITED STATES PATENTS

| 2,059,656 | Ring | Nov. 3, 1936 |

FOREIGN PATENTS

| 22,932 | Great Britain | of 1911 |
| 802,047 | France | of 1936 |
| 868,864 | France | of 1942 |